US006996720B1

(12) United States Patent
DeMello et al.

(10) Patent No.: US 6,996,720 B1
(45) Date of Patent: Feb. 7, 2006

(54) SYSTEM AND METHOD FOR ACCESSING PROTECTED CONTENT IN A RIGHTS-MANAGEMENT ARCHITECTURE

(75) Inventors: Marco A. DeMello, Redmond, WA (US); Vinay Krishnaswamy, Woodinville, WA (US); John L. Manferdelli, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 956 days.

(21) Appl. No.: 09/604,946

(22) Filed: Jun. 27, 2000

Related U.S. Application Data

(60) Provisional application No. 60/172,319, filed on Dec. 17, 1999, provisional application No. 60/172,318, filed on Dec. 17, 1999.

(51) Int. Cl.
 *G06F 12/14* (2006.01)

(52) U.S. Cl. ...................................... 713/189; 713/194

(58) Field of Classification Search ................ 713/189, 713/194; 380/201–203; 705/1, 51, 52, 54
See application file for complete search history.

(56) References Cited

U.S. PATENT DOCUMENTS 4,405,829 A   9/1983   Rivest et al. ............... 178/22.1
(Continued)

FOREIGN PATENT DOCUMENTS

EP            0 778 512 A2   6/1997
(Continued)

OTHER PUBLICATIONS

Riley, M., et al. (Eds.), "Open eBook™ Publication Structure 1.0," http://www.openebook.org/specification.htm, Sep. 16, 2000, 1-77.

(Continued)

*Primary Examiner*—Justin T. Darrow
(74) *Attorney, Agent, or Firm*—Woodcock Washburn LLP

(57) ABSTRACT

A digital rights management system for the distribution, protection and use of electronic content. The system includes a client architecture which receives content, where the content is preferably protected by encryption and may include a license and individualization features. Content is protected at several levels, including: no protection; source-sealed; individually-sealed (or "inscribed"); source-signed; and fully-individualized (or "owner exclusive"). The client also includes and/or receives components which permit the access and protection of the encrypted content, as well as components that allow content to be provided to the client in a form that is individualized for the client. In some cases, access to the content will be governed by a rights construct defined in the license bound to the content. The client components include an object which accesses encrypted content, an object that parses the license and enforces the rights in the license, an object which obtains protection software and data that is individualized for the client and/or the persona operating the client, and a script of instructions that provides individualization information to a distributor of content so that the content may be individualized for the client and/or its operating persona. Content is generally protected by encrypting it with a key and then sealing the key into the content in a way that binds it to the meta-data associated with the content. In some instances, the key may also be encrypted in such a way as to be accessible only by the use of individualized protection software installed on the client, thereby binding use of the content to a particular client or set of clients.

4 Claims, 5 Drawing Sheets

U.S. PATENT DOCUMENTS

| | | | |
|---|---|---|---|
| 4,688,169 A | 8/1987 | Joshi | 364/200 |
| 4,827,508 A | 5/1989 | Shear | 380/4 |
| 4,924,378 A | 5/1990 | Hershey et al. | 713/201 |
| 4,977,594 A | 12/1990 | Shear | 380/4 |
| 5,050,213 A | 9/1991 | Shear | 380/25 |
| 5,191,573 A | 3/1993 | Hair | 369/84 |
| 5,222,134 A | 6/1993 | Waite et al. | 380/4 |
| 5,359,659 A | 10/1994 | Rosenthal | 380/4 |
| 5,410,598 A | 4/1995 | Shear | 380/4 |
| 5,509,070 A | 4/1996 | Schull | 380/4 |
| 5,530,235 A | 6/1996 | Stefik et al. | 235/492 |
| 5,625,693 A | 4/1997 | Rohatgi et al. | 380/23 |
| 5,629,980 A | 5/1997 | Stefik et al. | 380/4 |
| 5,634,012 A | 5/1997 | Stefik et al. | 395/239 |
| 5,638,443 A | 6/1997 | Stefik et al. | 380/4 |
| 5,654,746 A | 8/1997 | McMullan, Jr. et al. | 725/29 |
| 5,666,411 A | 9/1997 | McCarty | 705/51 |
| 5,675,734 A | 10/1997 | Hair | 395/200.01 |
| 5,708,709 A * | 1/1998 | Rose | 705/59 |
| 5,708,780 A | 1/1998 | Levergood et al. | 395/200.12 |
| 5,715,403 A | 2/1998 | Stefik | 395/244 |
| 5,724,425 A * | 3/1998 | Chang et al. | 705/52 |
| 5,734,823 A | 3/1998 | Saigh et al. | 395/200.06 |
| 5,734,891 A | 3/1998 | Saigh | 395/610 |
| 5,742,677 A | 4/1998 | Pinder et al. | 380/242 |
| 5,765,152 A | 6/1998 | Erickson | 707/9 |
| 5,784,609 A | 7/1998 | Kurihara | 707/9 |
| 5,809,145 A | 9/1998 | Slik et al. | 380/25 |
| 5,845,281 A * | 12/1998 | Benson et al. | 707/9 |
| 5,883,955 A | 3/1999 | Ronning | 380/4 |
| 5,892,900 A | 4/1999 | Ginter et al. | 395/186 |
| 5,910,987 A | 6/1999 | Ginter et al. | 380/24 |
| 5,915,019 A | 6/1999 | Ginter et al. | 380/4 |
| 5,917,912 A | 6/1999 | Ginter et al. | 380/24 |
| 5,920,861 A | 7/1999 | Hall et al. | 707/9 |
| 5,933,498 A * | 8/1999 | Schneck et al. | 705/54 |
| 5,940,504 A | 8/1999 | Griswold | 380/4 |
| 5,943,422 A | 8/1999 | Van Wie et al. | 380/9 |
| 5,949,876 A | 9/1999 | Ginter et al. | 380/4 |
| 5,970,475 A | 10/1999 | Barnes et al. | 705/27 |
| 5,982,891 A | 11/1999 | Ginter et al. | 380/4 |
| 5,983,273 A | 11/1999 | White et al. | 709/229 |
| 5,991,399 A | 11/1999 | Graunke et al. | 380/4 |
| 5,991,402 A | 11/1999 | Jia et al. | 705/59 |
| 5,999,622 A | 12/1999 | Yasukawa et al. | 380/4 |
| 6,006,332 A | 12/1999 | Rabne et al. | 713/201 |
| 6,021,492 A | 2/2000 | May | 713/200 |
| 6,029,046 A | 2/2000 | Khan et al. | 725/31 |
| 6,035,403 A | 3/2000 | Subbiah et al. | 713/201 |
| 6,049,612 A | 4/2000 | Fielder et al. | 380/44 |
| 6,067,582 A | 5/2000 | Smith et al. | 710/5 |
| 6,088,717 A | 7/2000 | Reed et al. | 709/201 |
| 6,199,053 B1 | 3/2001 | Herbert et al. | 705/76 |
| 6,226,618 B1 | 5/2001 | Downs et al. | 705/1 |
| 6,298,446 B1 | 10/2001 | Schreiber et al. | 713/201 |
| 6,331,865 B1 | 12/2001 | Sachs et al. | 345/776 |
| 6,385,596 B1 | 5/2002 | Wiser et al. | 705/51 |
| 6,425,017 B1 | 7/2002 | Dievendorff et al. | 709/315 |
| 6,449,645 B1 | 9/2002 | Nash | 709/224 |
| 6,606,604 B1 | 8/2003 | Dutta | 705/26 |
| 6,629,138 B1 | 9/2003 | Lambert et al. | 709/224 |
| 6,718,361 B1 | 4/2004 | Basani et al. | 709/201 |
| 2001/0011238 A1 | 8/2001 | Eberhard et al. | 705/27 |
| 2002/0002611 A1 | 1/2002 | Vange | 709/223 |
| 2002/0069265 A1 | 6/2002 | Bountour et al. | 709/219 |

FOREIGN PATENT DOCUMENTS

| | | |
|---|---|---|
| EP | 0 795 809 A2 | 9/1997 |
| EP | 0 843 449 A2 | 5/1998 |
| WO | WO 96/24092 | 8/1996 |
| WO | WO 96/42041 A2 | 12/1996 |
| WO | WO 98/44402 A1 | 10/1998 |
| WO | WO 98/45768 A1 | 10/1998 |
| WO | WO 98/58306 A1 | 12/1998 |
| WO | WO 99/01815 A1 | 1/1999 |
| WO | WO 99/26123 A1 | 5/1999 |
| WO | WO 99/45491 A1 | 9/1999 |
| WO | WO 99/55055 | 10/1999 |
| WO | WO 99/63416 A2 | 12/1999 |
| WO | WO 00/08909 A2 | 2/2000 |
| WO | WO 00/21239 A1 | 4/2000 |
| WO | WO 00/75760 A1 | 12/2000 |

OTHER PUBLICATIONS

Jaeger, T., "Flexible Control of Downloaded Executable Content", *ACM Transactions on Information and System Security*, 1999, 2(2), 177-228.

Shamir, A. et al., "Playing Hide and Seek with Stored Keys", *Third International Conference*, 1999, franklin, M. (ed), 118-124.

Auchsmith, D., "Tamper Resistant Software: An Implementation", *First International Workshop*, Anderson, Ross (ed.,) 1996, 317-333.

* cited by examiner

SYSTEM AND METHOD FOR ACCESSING PROTECTED CONTENT IN A RIGHTS-MANAGEMENT ARCHITECTURE

CROSS-REFERENCE TO RELATED CASES

This application claims the benefit of U.S. Provisional Application No. 60/172,319 entitled "System and Method for Digital Rights Management," and U.S. Provisional Application No. 60/172,318 entitled "System for Distributing Content Having Multilevel Security Protection," both filed on Dec. 17, 1999.

FIELD OF THE INVENTION

The present invention relates generally to distribution of electronic content, and, more particularly, to systems and methods for accessing protected content in a rights-management architecture.

BACKGROUND OF THE INVENTION

As the availability and use of computers and palm-sized electronic devices has increased, it has become common for documents to be transmitted and viewed electronically. With improvements in the speed and facility of communication over infrastructures such as the Internet, there is a tremendous drive to provide enhanced services and content to the devices. Examples of services and content that may be provided are authored works, such as books or other textual material. Electronic distribution of text documents is both faster and cheaper than conventional distribution of paper copies. The same principle applies to non-text content, such as audio and video: electronic distribution of such content is generally faster and cheaper than the delivery of such content on conventional media (e.g., magnetic tape or optical disk). However, the low cost and instantaneity of electronic distribution, in combination with the ease of copying electronic content, is at odds with controlled distribution in a manner that protects the rights of the owners of the distributed works.

Once an electronic document is transmitted to one party, it may be easily copied and distributed to others without authorization by the owner of rights in the electronic document or, often, without even the owner's knowledge. This type of illicit document distribution may deprive the author or content provider of royalties and/or income. A problem with many present delivery schemes is that they may make no provisions for protecting ownership rights. Other systems attempt to protect ownership rights, but however, are cumbersome and inflexible and make the viewing/reading of the authored works (or otherwise rendering the authored works, in the case of non-text content such as music, video, etc.) difficult for the purchaser.

Thus, in view of the above, there is a need for an improved digital rights management system that allows of delivery of electronic works to purchasers in a manner that protects ownership rights, while also being flexible and easy to use. There is also a need for the system that provides flexible levels of security protection and is operable on several client platforms such that electronic content may be viewed/rendered by its purchaser on each platform. The digital rights management system of the present invention advantageously provides solutions to the above problems which protect the intellectual property rights of content owners and allow for authors or other content owners to be compensated for their creative efforts, while ensuring that purchasers are not over-burdened by the protection mechanism.

SUMMARY OF THE INVENTION

An architecture for a content-rendering client in a digital rights management ("DRM") system is provided. The architecture includes a rendering application (e.g., a text-viewing application or "reader") which renders content protected by the DRM system. The architecture also includes various security features that guard against unauthorized distribution or use of protected content, as well as software components that navigate the security features to allow content to be rendered in an appropriate client environment.

In accordance with the architecture provided, content may be protected at a plurality of levels, including: no protection, source sealed, individually sealed (or "inscribed"), source signed, and fully individualized (or "owner exclusive"). "No protection" content is distributed in an unencrypted format. "Source sealed" and "individually sealed" content is encrypted and bundled with an cryptographic key (the "content key") that is cryptographically sealed with certain rights-management data associated with the content, such that the key cannot be retrieved if the rights-management data has been altered. The distinction between "source" and "individual" sealing is that "individually sealed" content includes in the rights-management data information pertinent to the rightful owner (e.g., the owner's name, credit card number, receipt number or transaction ID for the purchase transaction, etc.), such that this information cannot be removed from a working copy of the content, thereby allowing for detection of unauthorized distributors. The particular type of information included is determined by the retailer of the copy. "Signed" content is cryptographically signed in such a way that the rendering application can verify its authenticity, or the authenticity of its distribution channel. "Fully individualized" content is encrypted content provided with a decryption key that has not merely been sealed with the rights-management information, but also encrypted in such a way that it cannot be accessed in the absence of a "secure repository" and "activation certificate," which are issued only to a particular client or set of clients, thereby limiting the use of such content to a finite number of installations. "Fully individualized" content also includes a license, which specifies the rights that a user may exercise with respect to the content.

In one embodiment of the invention, the client is used for reading books or text, which are distributed to the client in a file having protection as described above. Preferably, the client software and data relating to the protection and use of the content includes: the rendering application (called the "reader" in the case where the content is text); a "management" component that performs unsealing of protected content and certain other cryptographic functions; a software object that provides to content distributors information such as the installation and/or "activation" status of the reader application, as well as information about the "activation" certificate that is needed by the distributor in order to prepare "fully individualized" content whose decryptability is limited to a certain set of readers; and an "activation" software object that performs the function of obtaining a secure repository and activation certificate for installation on the client. Preferably, the activation software object is embodied as an ACTIVEX control, and the object that provides information to content-distribution sites is embodied as an ACTIVEX and/or browser plug-in wrapped in one or more Java script functions. Additionally, it is preferable that the management object be operable by the reader application through an API exposed to the reader application.

Preferably, the content key of fully individualized content is encrypted according to a public/private key pair associated with a particular activation certificate, and a copy of the activation certificate may be provided to various client devices owned or used by a particular person (or "persona"), such that one person can read the same "fully individualized" content on plural devices owned by that person, whereas other people who own similar devices cannot read that same "fully individualized" content because the necessary activation certificate will not be issued to those persons, thereby limiting the dissemination of fully individualized content.

Other features of the invention are described below.

BRIEF DESCRIPTION OF THE DRAWINGS

The foregoing summary, as well as the following detailed description, is better understood when read in conjunction with the appended drawings. For the purpose of illustrating the invention, like references numerals represent similar parts throughout the several views of the drawings, it being understood, however, that the invention is not limited to the specific methods and instrumentalities disclosed. In the drawings.

DETAILED DESCRIPTION OF THE INVENTION

Figure 1:
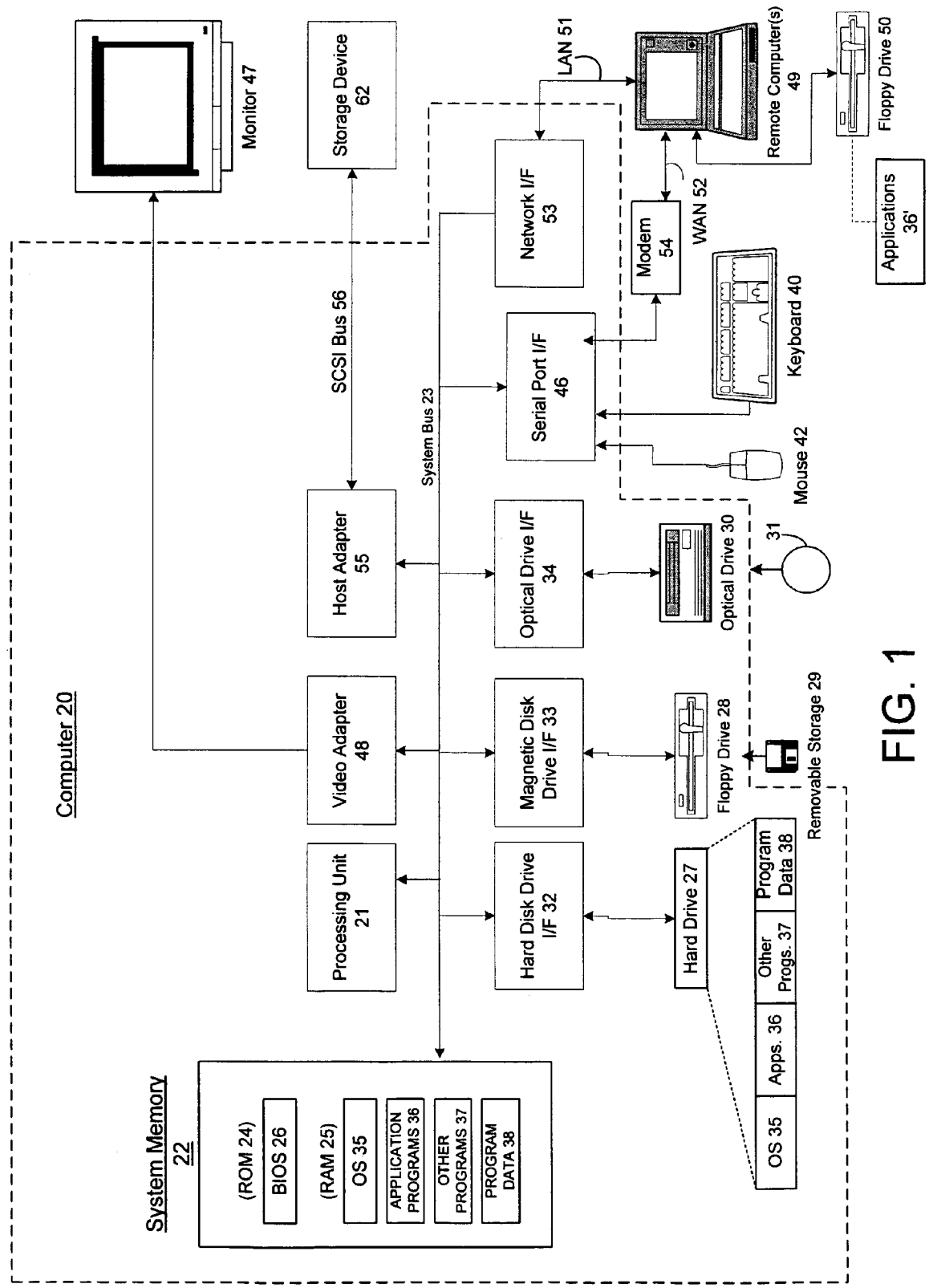
FIG. 1 is a block diagram showing an exemplary computing environment in which aspects of the present invention may be implemented.

The present invention is directed to a system for processing and delivery of electronic content wherein the content may be protected at multiple levels. A preferred embodiment of the invention is described, which is directed to the processing and delivery of electronic books, however, the invention is not limited to electronic books and may include all digital content such as video, audio, software executables, data, etc.

Overview

The success of the electronic book industry will undoubtedly require providing the existing book-buying public with an appealing, secure, and familiar experience to acquire all sorts of textual material. This material may include "free" or low-cost material requiring little copy protection, to "premium-quality" electronic book titles (herein "eBooks") requiring comprehensive rights protection. In order to enable a smooth transition from the current distribution and retail model for printed books into an electronic distribution system, an infrastructure must exist to ensure a high level of copy protection for those publications that demand it, while supporting the distribution of titles that require lower levels of protection.

The Digital Rights Management (DRM) and Digital Asset Server (DAS) systems of the present invention advantageously provides such an infrastructure. The present invention makes purchasing an eBook more desirable than "stealing" (e.g., making an unauthorized copy of) an eBook. The non-intrusive DRM system minimizes piracy risk, while increasing the likelihood that any piracy will be offset by increased sales/distribution of books in the form of eBooks. In addition, the present invention provides retailers with a system that can be rapidly deployed at a low-cost.

The primary users of the system are publishers and retailers, who use and/or deploy the system to ensure legitimacy of the content sold as well as copy protection. Exemplary users of the system may be the traditional publisher, the "leading edge" publisher, and the "hungry author." The traditional publisher is likely to be concerned about losing revenue from their printed book publishing operation to eBook piracy. The leading edge publisher is not necessarily concerned with isolated incidents of piracy and may appreciate that eBooks commerce will be most successful in a system where consumers develop habits of purchase. Meanwhile, the hungry author, who would like to collect money for the sale of his or her works, is more interested in attribution (e.g., that the author's name be permanently bound to the work).

As will be described in greater detail below, the DRM System of the present invention accomplishes its goals by protecting works, while enabling their rightful use by consumers, by supporting various "levels" of protection. At the lowest level ("Level 1"), the content source and/or provider may choose no protection via unsigned and unsealed (cleartext) eBooks that do not include a license. A next level of protection ("Level 2") is "source sealed," which means that the content has been encrypted and sealed with a key, where the seal is made using a cryptographic hash of the eBook's title's meta-data (see below) and the key is necessary to decrypt the content. Source sealing guards against tampering with the content or its accompanying meta-data after the title has been sealed, since any change to the meta-data will render the title unusable; however, source sealing does not guarantee authenticity of the a copy of the title (i.e., source sealing does not provide a mechanism to distinguish legitimate copies from unauthorized copies). In the case of the "hungry author," the author's name may be included in the meta-data for permanent binding to the content, thereby satisfying the "hungry author's" goal of attribution. A next level of protection ("Level 3") is "individually sealed" (or "inscribed"). An "individually sealed" title is an eBook whose meta-data includes information related to the legitimate purchaser (e.g., the user's name or credit card number, the transaction ID or receipt number from the purchase transaction, etc.), such that this information is cryptographically bound to the content when the title is sealed. This level of protection discourages people from distributing copies of the title, since it would be easy to detect the origin of an unauthorized copy (and any change to the meta-data, including the information related to the purchaser, would make it impossible, or at least improbable, that the necessary decryption key could be unsealed).

The next level of protection ("Level 4") is "source signed." Source signed eBooks are titles that can be authenticated by a "reader" (which, as more particularly discussed below, is a user application that enables the reading of eBooks on a computing device, such as a PC, a laptop, a Personal Digital Assistant (PDA), PocketPC, or a purpose-built reading device). Authenticity may preferably be defined in three varieties: "tool signed," which guarantees that the eBook title was generated by a trusted conversion and encryption tool; "owner signed," which is a tool signed eBook that also guarantees the authenticity of the content in the copy (e.g., the owner may be the author or other copyright holder); and "provider signed," which is a tool signed eBook that attests to the authenticity of its provider (e.g., the publisher or retailer of the content). The "tool," the owner, and the provider may each have their own asymmetric key pair to facilitate the creation and validation of digital signatures of the information. A title may be both provider signed and source signed, which facilitates authentication of the distribution channel of the title (e.g., through a signature chain in the copy). The strongest level of protection is "fully individualized" or "owner exclusive" ("Level 5"). "Fully individualized" titles can only be opened by authenticated reader applications that are "activated" for a particular user, thereby protecting against porting of a title from one person's reader (or readers) to a reader that is not registered to that person. In order for the reader of the present invention to open a title protected at Level 5, the Reader must be "activated" (i.e., the device on which the reader resides must have an activation certificate for a particular persona, and a secure repository). The process of Activation will be described in greater detail below with reference to FIG. 5.

The systems of the present invention also define an architecture for sharing information between a reader, a content provider and a content source, how that information is used to "seal" titles at the various levels, and how that information must be structured. The availability of these choices will enable content sources to pick and choose which content will be sold to what users and using what protection (if any). The particular information may be used to sign and/or seal titles for use by a reader, and a compatible reader (which, in the case of level 5, may be a reader activated for a particular persona) may unseal the title and enable reading of the eBook.

System Architecture

As shown in FIG. 1, an exemplary system for implementing the invention includes a general purpose computing device in the form of a conventional personal computer or network server 20 or the like, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer or network server 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer or network server 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows® 2000, Windows NT®, or Windows 95/98), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus 23, but may be connected by other interfaces, such as a parallel port, game port, universal serial bus (USB), or a 1394 high-speed serial port. A monitor 47 or other type of display device is also connected to the system bus 23 via an interface, such as a video adapter 48. In addition to the monitor 47, personal computers typically include other peripheral output devices (not shown), such as speakers and printers.

The personal computer or network server 20 may operate in a networked environment using logical connections to one or more remote computers, such as a remote computer 49. The remote computer 49 may be another personal computer, another network server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise-wide computer networks, Intranets and the Internet.

When used in a LAN networking environment, the personal computer or network server 20 is connected to the local network 51 through a network interface or adapter 53. When used in a WAN networking environment, the personal computer or network server 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer or network server 20, or portions thereof, may be stored in the remote memory storage device 50. It will be appreciated that the network connections shown are exemplary and other means of establishing a communications link between the computers may be used.

Client Architecture

Figure 2:
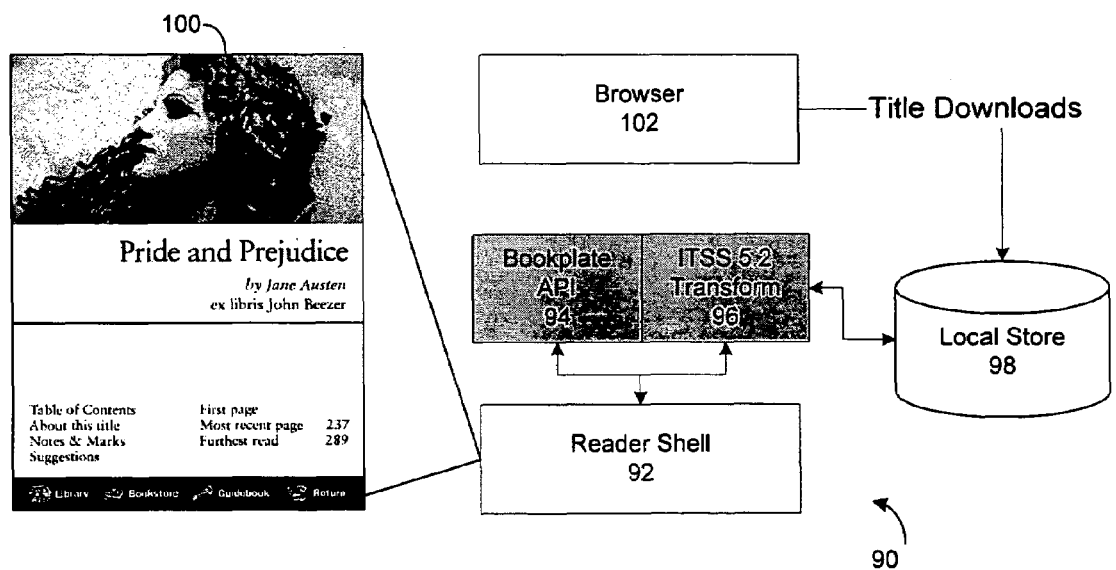
FIG. 2 is a block diagram of a first embodiment of a client architecture implementing aspects of a digital rights management system in accordance with the invention.

Referring now to FIG. 2, there is illustrated a first exemplary client architecture 90 in accordance with the present invention. The client architecture 90 may be implemented on the personal computer 20 of FIG. 1 or other appropriate computing device, such as a palm-sized computer, laptop computer, or closed device that is purpose-built for reading eBook titles. Client architecture 90 includes a reader shell 92

(or "reader 92") for reading the eBook titles 10 and a web browser 102 (e.g., the MICROSOFT® INTERNET EXPLORER browser) for contacting Retailer/Distributor sites. A cryptographic transform is provided, which may be a plug-in for an Information Technology Storage System (ITSS) 5.2 96. The cryptographic transform is a software component that will unseal the content key and decrypt the content stream coming out of the eBook file or "LIT file" 10 (shown in FIG. 4). The cryptographic transform is preferably implemented as an extension to existing ITSS 96 code being used by the Reader 92 for LIT files 10. This extension is instantiated whenever encrypted content is accessed. A Bookplate API 94 is provided which returns the purchaser's name (or other information related to the purchaser) from the cryptographically hashed Bookplate stream 14C inside the DRM Storage object 14 of each title 10 (e.g., in the case of individually sealed titles that include the purchaser's name or other identifying information in their meta-data). The string returned by this function may be used on the book cover page 100 to identify the rightful owner of the title 10; an example, in which the string is the user's name, is depicted in FIG. 2. If the user clicks on the name displayed (or taps, in the case of touch-screen devices) or a Copyright Notice/Icon on the cover page, a dialog-box emphasizing the copyrighted nature of the publication may be rendered. Local store 98 is preferably a directory or folder where eBooks may be stored. (As discussed below in connection with FIG. 4, eBook 10 is a file containing the content of the book, as well as other information.) For example, when architecture 90 is implemented on a device operating under one of the MICROSOFT WINDOWS operating systems, local store 98 may simply be a directory called "C:\MyLibrary." Browser 102 is a typical browsing program (such as the MICROSOFT INTERNET EXPLORER browser or the NETSCAPE NAVIGATOR browser); it is used to contact retail sites that sell eBooks and to engage in transactions with those sites. In some cases, reader 92 may have an "integrated bookstore" feature that contacts retail sites and facilitates shopping without the use of a general browsing application 102.

Figure 3:
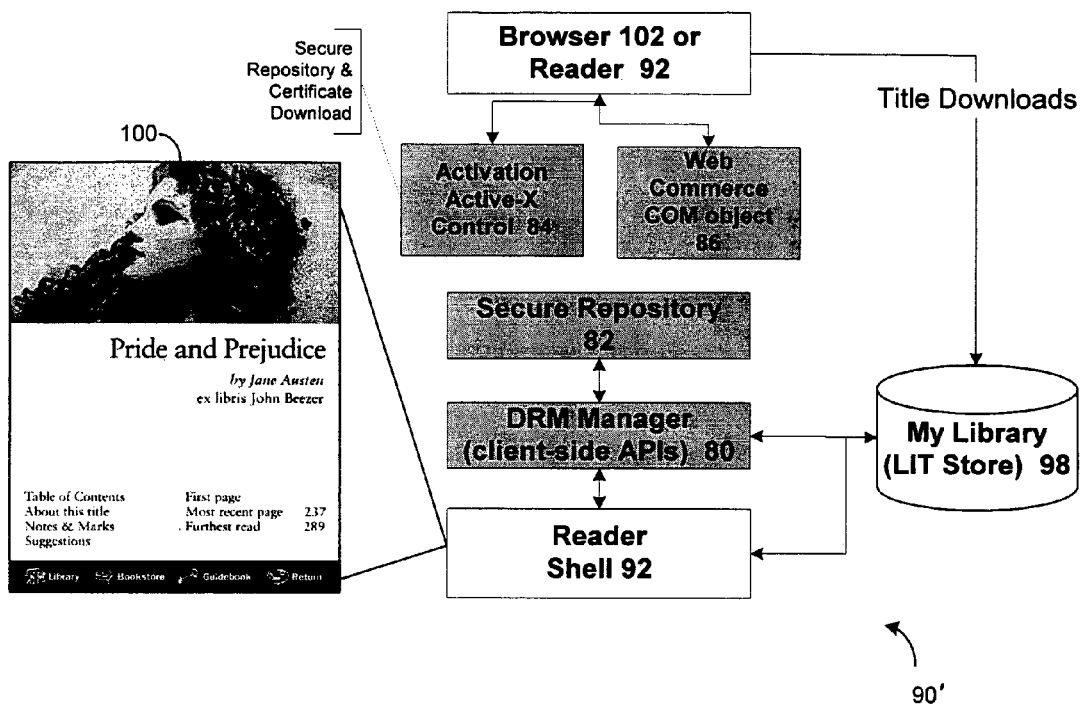
FIG. 3 is a block diagram of a second embodiment of a client architecture implementing aspects of a digital rights management system in accordance with the invention.

Referring now to FIG. 3, there is illustrated a second exemplary client architecture 90'. In the second client architecture, like reference numerals represent like elements as in the first client architecture, and the therefore the descriptions of these like elements are not be repeated below. The DRM Manager 80 is a component that exposes a set of internal APIs to the reader 92, which manage the authentication of applications requesting access to encrypted LIT files, in addition to carrying-out decryption of content, unsealing of keys, returning of a Bookplate string (e.g., the user's name for display in the case of, for example, level 3 or level 5 titles), etc. For example, the code for reader 92 may include an interface call that is part of the API, where the call invokes computer-executable instructions to carry out one of the above-listed functions. The computer-executable instructions may be embodied in a COM object and/or a dynamic-link library (DLL) for use by the reader 92. Different versions of the COM object and/or DLL may be provided to accommodate updates to technologies (i.e., to allow reader 92 to work transparently, though a constant API, with various different DRM technologies, some of which may not even have been developed at the time that the code for reader 92 was created.) In one example, the developer/administrator of architecture 90' may provide a specification or description of interface (e.g., a set of method names/labels for the API) to the developer of the reader 92, and may then provide a DLL or COM object (or successive DLLs and COM objects) to the users of client architecture 90'. In another example, the developer/administrator of architecture 90' may be the same entity who provides reader 92, and may define an API for DRM manager 80 to facilitate communication with the various components of architecture 90'.

The secure repository 82 is an executable that is downloaded during the Activation process and enables the Reader to open Fully Individualized (Level 5) eBooks (LIT files). The secure repository 82 is preferably unique (or substantially unique) for each computing device on which architecture 90' is implemented (e.g., a PC or purpose-built reading device). Secure repository 82 holds a private key that is required for opening Level 5 protected titles. Secure repository 82 may be obtained during the activation process (described below). In one example, the computing device on which architecture 90' resides uploads (via a network, such as network 52) a hardware ID to a "secure repository server" (not shown), where the hardware ID is based on hardware associated with the computing device (e.g., by serial numbers or other numbers associated with that hardware) and uniquely identifies the device. The "secure repository server" may then download to the computing device a secure repository whose code is based on, and whose proper execution is preferably tied to, the computing device on which architecture 90' is implemented, where the secure repository performs functions including applying a unique private key that is used in the process of unsealing the content key, as well as decrypting the content. In an exemplary embodiment, the content in a level 5 title is encrypted with a symmetric key, the symmetric key is encrypted with a public key contained in an activation certificate, the encrypted symmetric key is sealed with the title, and the activation certificate's private key is contained in the activation certificate in a form encrypted by the public key of secure repository 82. In this example, secure repository 82 decrypts the activation certificate's private key using the private key of secure repository 82, and then the activation certificate's private key is used to decrypt the symmetric key. A system and method for creating secure repository 82 is described in Ser. No. 09/604,543 filed concurrently herewith and expressly incorporated by reference in its entirety.

The activation ACTIVEX control 84 is a component used by the client computing device during the activation process (see below). Preferably, ACTIVEX control 84 is used by a browser (e.g., a MICROSOFT INTERNET EXPLORER browser), which, in turn, is hosted by reader 92 (although ACTIVEX control 84 could also work with a stand-alone browser.) The activation ACTIVEX control 84 exposes methods that provide for the validation of servers (e.g., the "activation server(s)") to which reader 92 (or the computing device on which it resides) is connected, computation of the hardware ID, downloading of secure repository 82 (and associated activation certificates), and authentication and installation of the downloaded executable. For example, reader 92 (or another software component) may contain instructions to detect whether reader 92 has been activated and, if it has not been activated, may issue one or more instructions to activation ACTIVEX control 84 to perform the activation, and those instructions may include instructions to perform the acts listed above.

The web commerce object 86 is distributed as both an ACTIVEX control and a NETSCAPE NAVIGATOR® plug-in. It may be used, via client-side scripting, by retailers when selling fully individualized copies (i.e., Level 5 protected copies). This COM object 86 is preferably wrapped by client side script functions, which abstract the actual methods and underlying differences between the plug-in and the ACTIVEX control. The key methods provided by the web commerce object 86 and its accompanying interface are: detection of the installation of reader 92, detection of activation status, launching of the reader into the activation process (see, FIG. 5), retrieval of encrypted PASSPORT ID with which the reader was activated, and retrieval of a (preferably encrypted) activation certificate during download of fully individualized copies (Level 5 protected). For example, a script (such as a Java script) may be distributed to retailers of eBooks for inclusion in the retailer's web pages. The script may expose function calls that implement the above-listed methods, and the script may include code to determine whether it is being executed by a MICROSOFT INTERNET EXPLORER browser or a NETSCAPE NAVIGATOR browser, where it uses the ACTIVEX control in the first case, and the plug-in in the second case. A retailer may effectively transmit instructions to be performed on the client computing device by transmitting the script that defines the function calls along with script instructions that invoke the functions. For example, a retailer may wish to detect whether reader 92 is installed on a client's computing device, so the retailer may transmit to the client device a web page containing the Java script that defines the function of detecting whether reader 92 is installed, along with an instruction to invoke that function. The detecting function itself may include code to perform the detecting function of either the ACTIVEX control or the plug-in depending on the brand of browser the script is executing on. In this way, the particular browser is transparent to the retailer, who may create a single web page that performs any of the above-listed functions on either browser.

eBook File Structure

Figure 4:
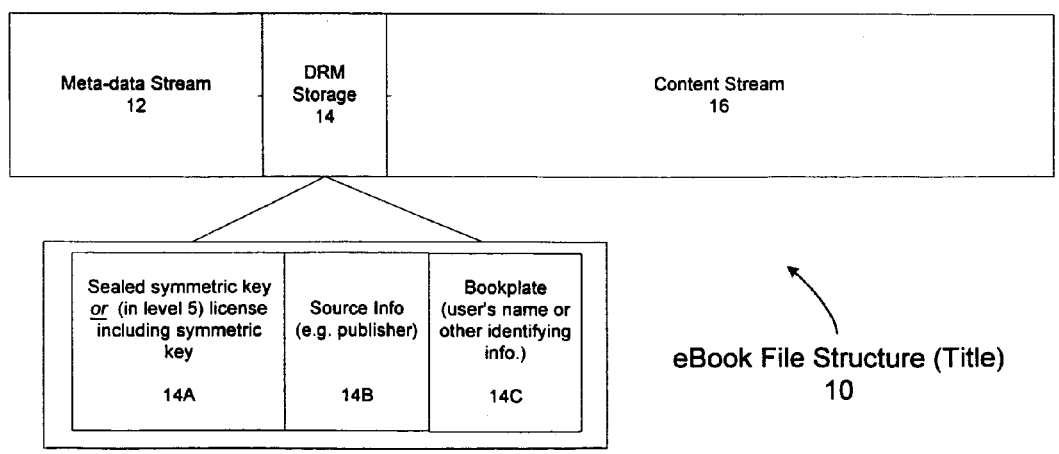
FIG. 4 is an exemplary electronic book (eBook) title file format.

Referring now to FIG. 4, an exemplary eBook (or "LIT") file structure is shown. The eBook 10 contains content 16, which is text such as a book (or any electronic content, such as audio, video, etc.) that has been encrypted by a key (the "content key"), which itself has been encrypted and/or sealed. In a preferred embodiment, the key is a symmetric key 14A that is sealed with a cryptographic hash of meta-data 12 or, in the case of level 5 titles, with the public key of the user's activation certificate. This key is stored either as a separate stream in a sub-storage section of the eBook file (stream 14A of DRM Storage 14 in FIG. 4) or, in the case of level 5 titles, in the license. (In the case of level 5 titles, instead of storing the content key as a separate stream, stream 14A contains a license, which is a construct that defines the rights that the user can exercise upon purchase of the title. In titles that have a license, the content key is contained within the license.) Also included in the DRM storage 14 are the source stream 14B, which may include the name of the publisher (or other content source), as well as the bookplate stream 14C, which, for individually sealed (level 3 and/or level 5) titles, includes the consumer's name as provided by the retailer (which may, for example, be obtained as part of the commercial transaction of purchasing an eBook 10, such as from the consumer's credit card information). The method of calculating the cryptographic hash that encrypts and/or seals the symmetric key 14C (or the method of using such cryptographic hash to seal the key) is preferably a "secret" known only to trusted content preparation tools and trusted rendering applications. Using a hash in this way may complicate/discourage tampering with the meta-data 12 contained with the eBook 10. It is noted that any method may be used to "seal" an eBook, so long as such method provide some measure of tamper resistance to the eBook 10.

In accordance with the present invention, the meta-data 12 may include a copyright tag, which describes the rights granted to the user or purchaser by the content source (e.g., the publisher). Whenever such tag is present, reader 92 may display to a user the text included in the tag, for example when the user taps on the name displayed on cover page 100 (shown in FIGS. 2 and 3) in the case of individually sealed copies, or on the "Copyright Notice" link (in the case of source sealed copies with a copyright tag), which may also be rendered on cover page 100. If the copyright tag is not included in meta-data 12 by the content source, but the eBook title has been individually sealed (Level 3), the reading application based on the disclosed system (e.g., reader 92) may render a generic copyright notice such as the following message, or a similar message: "No part of this electronic publication may be reproduced, re-distributed, or re-transmitted in any form or by any means, electronic, mechanical, printing, photo-copying, recording, or by any information storage and retrieval system, without written consent from the publisher." It will be appreciated that the act of displaying a copyright notice serves to deter typical users from attempting to copy their eBooks, and such a notice may be displayed at any point during the viewing of an eBook when it is deemed advantageous to remind users that they are viewing proprietary material.

Activating a Reader

As noted above, activation enables a reader client for purchase, download, and viewing of fully individualized (i.e., level 5) eBook titles. Because computers running one of the MICROSOFT WINDOWS® operating system (or other general-purpose operating systems) are essentially open platforms where anyone can debug a running process and create "patches" (software modification modules) for hacking the security of any application, the need to establish a security framework around the Reader Client is a pre-requisite for providing true copy protection/resistance. "Activation" is the process by which this framework is established for reader 92.

It is preferable that the activation process be performed using a "namespace authority," such as MICROSOFT® PASSPORT™, as the activation database. The use of PASSPORT™ advantageously allows the linking of the user's activation certificate to his/her persona. As used herein, a "persona" is a unique identifier that can be tied to a user and can be securely authenticated by an out-of-band process—e.g., a username and password form on a web browser for use over a secure socket layer (SSL) is an example embodiment of such an process. Using a "persona" schema, an individual may read purchased titles on any reader that has been activated using the "persona" under which the title was purchased. Also, once activated, the activation information may be made available to multiple merchants in order to eliminate the need for server-to-server communications between the merchants and the activation authority, while mitigating privacy concerns.

The process by which a Reader is activated will now be described. Once a user purchases a purpose-built eBooks reading device, or obtains reader software for a PC (e.g., via CD-ROM 31, or download via a wide-area network 52 such as the Internet), the user is encouraged to activate the reader the first time the reader is launched (e.g., immediately after Setup for the Laptop/Desktop application). For example, each time the reader is launched, it may check to see whether it has been activated (or another software object may check whether the reader has been activated). If the reader has not been activated, the reader will render a dialog box reminding the user he or she will not be able to acquire premium titles that require full individualization (i.e., level 5 protection). An example of such a reminder is:

> Congratulations on installing the Microsoft® Reader. In order to enable your Reader for purchase and download of premium titles that have been secured for distribution, you'll need to Activate it online.

The dialog may include buttons to allow the user to activate the reader 92 (e.g., the dialog box may display two buttons marked "Activate Reader now" and "Activate Reader later"). A "checkbox" may be included in the dialog box with a message such as "Please don't show me this message in the future," which the user would check if he or she has no interest in acquiring level 5 titles, so that the reader would cease displaying the activation message upon launch. If the Reader has been previously activated, the PASSPORT ID or persona ID of the last user that activated the reader will be rendered as well as in a "splash screen," such as "Activated for <persona>." User may also activate the reader from any retail web site, while shopping with a stand-alone browser. In this scenario, merchants may leverage a method exposed by the Reader Web Commerce object 86 and associated script wrapper API to render a link and/or button that launches reader 92 as a separate process. For example, a merchant may include in a web page a script function that launches reader 92 into its activation feature, which then guides the user through the activation steps, just as if the user had started the reader and launched the activation feature on his own. (As noted above, the script function may perform the launch either using an ACTIVEX control or a plug-in according to what type of browser it is running on.) The merchant may also include in a web page an instruction (using the web commerce object 86 and associated script wrapper) to first detect whether reader 92 is activated, and launch the activation process only if reader 92 has not been previously activated. In another scenario, reader 92 may be using an "integrated bookstore" feature of the reader (e.g., a feature that allows the user to shop various web sites that sell eBooks without using a browser), and the activation process may be launchable from (or part of) the "integrated bookstore" feature of reader 92.

Figure 5:
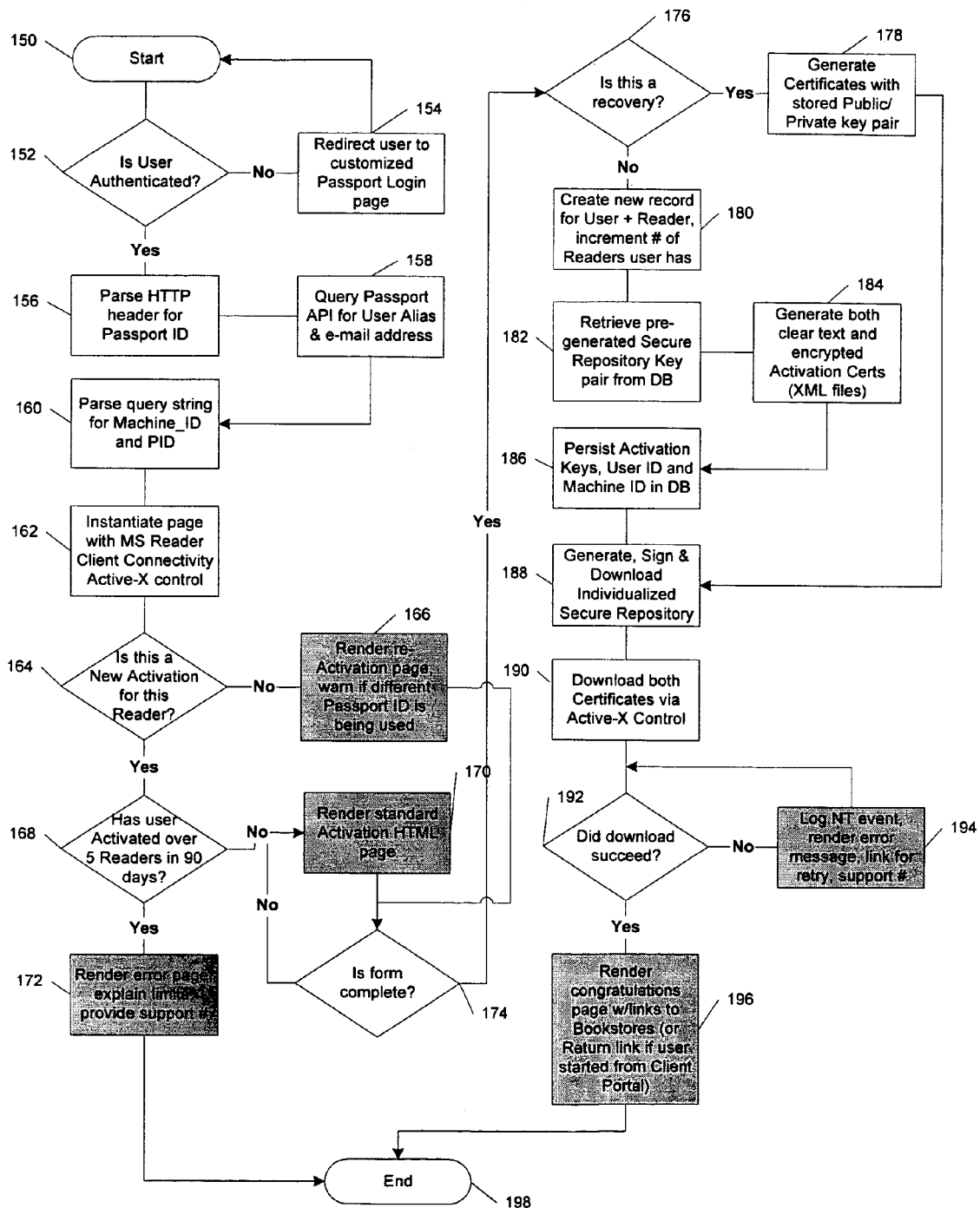
FIG. 5 is a flow diagram illustrating a reader activation process.

Assuming the user has decided to activate the reader 92, the activation process may include the steps illustrated in FIG. 5. At step 150, the reader client opens into the "integrated bookstore" section and connects, via Secure Sockets Layer (SSL), to the activation servers, where users are prompted to login using their PASSPORT™ credentials (step 152). If the user does not have a PASSPORT™ account, he/she will be provided with at link to sign-up for one (step 154). It is preferable that the URL to the Activation Server be hard-coded into an Activation ACTIVEX control 84 using a SSL connection such that the client can guarantee that the servers are truly the activation servers.

Once user is authenticated with PASSPORT™ (step 156), a PASSPORT™ API is queried for the user alias and e-mail address (step 158). Thereafter, at steps 160–162, the Activation Servers will request that the client (via the ACTIVEX control) upload a unique hardware ID (which, as noted above, may be derived from hardware components on the user's computing device which substantially uniquely identify the user's computing device). Next, it is determined whether this is a first activation for reader 92 (step 164). (In some circumstances, readers may be activated more than once with different PASSPORT IDs; if reader 92 has been activated with another PASSPORT ID, then a warning is displayed, as depicted at step 166.)

If it is determined that this is a new activation at step 164, then it is determined whether the user has activated more than five readers in the past 90 days. If so, then an error message is rendered at step 172: including a support telephone number, and the process terminates at step 198. As noted above, the limitation of activating no more than five readers in the past 90 days is merely exemplary. Limiting activation of readers by time and number helps to prevent wide dissemination of a level 5 eBook title for viewing on thousands (or millions) of readers throughout the world. The "five readers in ninety days" limitation in the example of FIG. 5 is merely exemplary, however, as other limitations on activation may be imposed without departing from the spirit and scope of the invention. For example, the activation limitation depicted in FIG. 5 could be extended by allowing additional activations once a predetermined period of time elapses, e.g., one additional activation after a subsequent 90 day period elapses up to a limit of 10 total activations.

If the user has not activated more than five readers within the first 90 days (or is not otherwise precluded from activating reader 92), an activation page is rendered (step 170) for the user to fill out. If the user transmits the form in an incomplete format (detected at step 174), the page may be re-rendered until the user completes the form. Next, at step 176, it is determined if the present activation is a recovery (i.e., an attempt to "reactive" a reader that has been previously activated but become unusable or disabled for some reason). If the present activation is not a recovery, then a new record is created for the user and reader and the number of readers associated with the user is incremented (step 180). A pre-generated secure repository key pair is retrieved from a database (step 182) and activation certificates are also generated (step 184). (As discussed above, the activation certificate may include a public/private key pair whose private key has been encrypted with the public key of the secure repository key pair.) The activation keys, User ID, and Machine ID are persisted in a database (not shown) at step 186. Preferably, the secure repository keys are not persisted, and any new secure repository that needs to be created and delivered in the future would have a new key pair (and the activation certificate delivered with that new secure repository may contain the persisted activation key pair, but with the private key encrypted to the (new) public key of the (new) secure repository).

If, at step 176, it is determined that this activation is a recovery, then an activation certificate is generated (step 178) using the stored public/private key pair from a prior activation (the public/private key pair being retrieved from the database in which it was persisted at step 186), and processing continues at step 188.

At step 188, the activation server(s) generate a secure repository executable 82. Preferably, the secure repository executable 82 is digitally signed, and based on and/or bound to a machine ID. The activation server(s) also generate an activation certificate, which is preferably tied to the user's persona through his/her PASSPORT™ ID). The secure repository executable 82 and activation certificate are then downloaded to the client (steps 188 and 190). The activation certificate is encrypted during download (e.g., to protect any information contained in the certificate that relates to the persona to which it is tied). The activation certificate is later uploaded to a "download" or "fulfillment" server during the eBook acquisition process described below in connection with FIG. 6 (i.e., as part of the process of acquiring a level 5 title). The user's PASSPORT™ ID is encrypted and stamped in the PC Registry as part of this download (when reader 92 is installed on a computing device that has a registry), for upload during commercial transactions. The PASSPORT™ ID is stored separately from the activation certificate (even though it may be included in the activation certificate) so that the stored PASSPORT ID may be compared with the PASSPORT ID in the activation certificate during the acquisition of a level 5 title, thereby helping to prevent theft of content.

At step 192 it is determined whether the download of secure repository 82 and the activation certificate has succeeded. If not, an event is logged and the download is attempted again (steps 194 and 192). If the download was successful, then at step 196, the user may be provided with a page that "congratulates" him/her on activating reader 92 and informing him/her that the activation process is complete. In one example, the page may include links where the user may obtain "promotional" or "free" eBooks. This link will change depending on the promotion (i.e., the server may download a different page with different links if the "promotion" changes). This link may also leverage a method exposed by the Activation ACTIVEX Control 84 to return the user to the library page on the reader. The process then terminates at step 198.

eCommerce Process Flow

Figure 6:
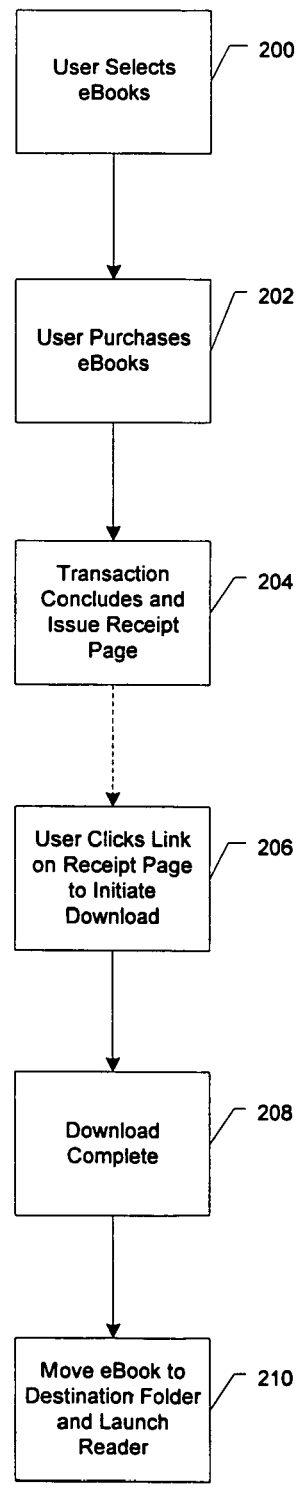
FIG. 6 is a flow diagram illustrating exemplary processes of selecting, obtaining and reading an eBook using a digital rights management system according to the invention.

Referring now to FIG. 6, an overview of the basic process by which eBook titles are acquired and delivered online is described. It is noted that the reader of the present invention is adapted to interact and operate within a server environment. Such an exemplary server environment is described in U.S. Application No. 09/604,946 filed concurrently herewith, which is expressly incorporated by reference herein in its entirety.

Using a browser or the "integrated bookstore" feature of reader 92, the user visits a retail site and chooses book(s) in a manner implemented by the retailer (step 200). For example, the site may provide a web page that displays (as links) various books that the user may wish to purchase. The user then pays for the titles (step 202), such as by submitting a credit card number (or by referencing a stored credit card number if the user has an account with the site; in one usage, the user's PASSPORT ID may reference such a number or account). The transaction concludes at step 204 with a receipt page. The receipt page may contain information "confirming" the order or thanking the user for his/her order, and also contains links (HTTP POST requests) for downloading each title purchased. For fully individualized titles (level 5), a client-side script populates the body of the POST with the activation certificate, via web commerce object 86. (E.g., web commerce object 86 is used to retrieve the activation certificate for provision to the retailer's site.) In one example, the activation certificate may be provided to the retailer web site, which then creates an HTTP request (i.e., a POST request) which includes an encrypted blob (i.e., in the body of the POST). The HTTP request (including the encrypted blob) is then rendered as a link at the client site, where the client clicks the link to download the purchased title (as described below). In this example scenario, the HTTP request and encrypted blob (which are generated by the retailer, who, preferably, is in privy with the fulfillment site) contains information that identifies the particular eBook to be provided to the purchaser, as well as information that demonstrates to the fulfillment site that the encrypted blob was generated by a retailer for whom the fulfillment site has agreed to fulfill eBook orders. Additionally, in the case of the purchase of level 5 titles, client side software adds the activation certificate to the body of the POST to allow the symmetric key of the eBook to be encrypted for use with readers activated to the user's persona.

Upon clicking on any of the links at step 206, the browser initiates a download from a download or "fulfillment" server specified in the receipt page. For individually sealed ("inscribed") copies, the download server adds the consumer's name (or other identifying information as determined by the retail site, such as the user's credit card number, a transaction ID, etc.) to the title meta-data and re-seals the symmetric key using the new cryptographic hash resulting from the new meta-data, which now includes such identifying information. (The particular information to be included is determined by the retailer and provided as part of the encrypted blob in the body of the POST.) For fully individualized copies (level 5) a license is generated and embedded in the LIT file, in addition to the bookplate being created. This license contains the symmetric key that encrypted the LIT file "sealed" with the public key in the activation certificate. When the download is complete (step 208), the download server logs the transaction and, on the client, the reader 92 may be launched automatically (step 210). The title may, at this time, be moved into local store/LIT store 98, or another folder or directory designated for the storage of eBook titles. Upon launch of the reader 92, the eBook may be opened to its cover page 100.

In accordance with the present invention, from an end-user's perspective, there may be no perceptible difference between a level 3 and a level 5 protected title. Both include a bookplate (e.g., inclusion of the user's name on the cover page 100). Users may only notice the difference if they try to move a level 5 eBook to an installation where the reader 92 has not been activated for the persona that purchased the eBook. In this case, a level 5 title will not open on such a reader 92, whereas a level 3 title will open.

DRM System Client Usage Scenarios

The DRM system architecture is driven by several scenarios that consumers of eBooks are expected to encounter. Exemplary scenarios are explained below. Such scenarios include buying a book on impulse, reading a book on multiple readers 92, activating a reader 92, and recovering a lost or damaged title. The scenarios have variations according to the level of copy protection chosen by the publication provider. The variations impact the user because they determine in some cases what the user must do in order to acquire and open a title on one or more readers 92.

Buying a Book on Impulse and Reading

When a consumer browses a retailer's web site using a web browser or a "bookstore" feature inside reader application 92, he or she may select books to be purchased (e.g., build a "shopping cart"), and proceed to checkout in accordance with the rules and/or procedures of the retail site. Depending on the level of protection associated with the selected titles (which may, for example, be determined by the retail site, or the content owner on whose behalf the retail site distributes the eBook), the retail site may request information which uniquely identifies the customer. (E.g., if the title is protected at level 3, the retailer acquires the user's name from a (preferably) trusted source for inclusion in the meta-data, so that a user could not purchase a title under a false name and escape detection if the title is illicitly distributed. In this scenario, other information from which the purchaser can be traced, such as the user's credit card number, a transaction ID, etc., could be used to serve the same purpose) If the title is protected at level 5, the retail site will also need the activation certificate (preferably obtained by use of web commerce object 86 an its associated script wrapper) in order to properly encrypt the content key. If the customer/browser is not able to provide the required information to complete the transaction, the retail site may then provide the customer with the steps that are required (e.g., in the form of a web page that explains the steps and how they may be accomplished and/or provides hyperlinks to be followed). Upon completing the transaction, it is preferable that the customer receive a receipt to confirm transaction (i.e., an order confirmation page) or receive informational errors reporting issues with processing their transaction in accordance with the retail site's rules and policies. Next, the purchaser follows download instructions embedded in the receipt for the books they purchased, according to the rules and policies set forth by retail site. (E.g., the receipt may contain a hyperlink to be clicked by the user in order to begin the download of an eBook.) After the eBook has been downloaded, it may be opened for reading by reader 92.

Reading a Book on Multiple Readers

Consumers will expect to be able to read titles on more than one reading platform, e.g., a desktop PC, laptop, palmtop or an eBook device. The DRM System of the present invention provides for such usage. As part of the DRM system, publishers, distributors and merchants may be holders of symmetric keys that are used to encrypt eBooks titles. Preferably, one key is used per title or SKU/ISBN/EAN. The symmetric key is required to open the title and is embedded in the license/DRM stream during the purchase. The process of encrypting and later embedding the symmetric key will be referred to herein as "sealing." It is noted that the symmetric key may be encrypted using a public key associated with the consumer's activation certificate keypair, or, in the case of source and individually sealed copies, may be encrypted with a cryptographic hash of the metadata.

In order to read the encrypted title on multiple readers 92, each instance of the reader 92 needs to be able to access the symmetric key 14A embedded in the title's License/DRM stream. In the case of protected titles that are not fully individualized to a person (e.g., titles at levels 2, 3, or 4), accessing symmetric key 14A is accomplished by using (e.g., hashing) the title's meta-data to unseal, and possibly decrypt, the symmetric key 14A, which is preferably done by DRM manager 80. In this scenario, the merchant/distributor of the title encrypts the symmetric key 14A with a cryptographic hash, which is programmatically generated from a hash of the title's meta-data (which may include the rightful owner's name, for example, in the case of level 3 titles). Reader 92 and/or DRM Manager 80 then uses the same hash algorithm to unseal the symmetric key. Users that tamper with the contents of the title's meta-data will no longer be able to read the eBook title, since reader software will not be able to decrypt/unseal the symmetric key 14A, because the new meta-data would result in a different hash.

In the case of fully-individualized (level 5) titles, the symmetric key 14A is encrypted with the public key of the user's activation certificate and inserted into the license, where the license is inserted into DRM storage 14 in stream 14A (see FIG. 4) prior to download. As discussed above, each reader 92 activated to a particular persona has an activation certificate containing the public/private key pair associated with the persona. Thus, a title may be read on any reader 92 that has been activated to a particular persona. As discussed above, the activation certificate is obtained during the activation process. The aforementioned "license," as further discussed below, is a construct that defines the rights that the consumer can exercise upon purchase of the content and, where it is present, it also contains the content key (i.e., the symmetric key).

Client architecture 90' decrypts the encrypted symmetric key contained in the license of a level 5 title by applying the private key from the activation certificate, where the activation certificate private key is stored in encrypted form and is obtained by using secure repository 82 to apply its public key to the encrypted private key, as discussed above. Beyond ensuring that a reader 92 has been activated using the credentials (i.e., persona) for which a level 5 title was prepared, no other action is required to permit a user to read a title on multiple readers 92. Moreover, even in the case of level 5 titles, the act of ensuring that the reader is activated to the correct persona takes place implicitly—that is, if the reader 92 has not been activated to the person with which a level 5 title is associated, then the reader 92 will not have access to the activation certificate (and its private key) that allows the reader to access symmetric key 14A needed to decrypt content steam 16. All the level 5 titles purchased for a reader 92 have their content keys encrypted to the public key included in the activation certificate associated with the reader/persona. When the user installs or purchases another reader 92, the user only needs to activate the new reader with the same persona to receive the same activation certificate (or, more precisely, an equivalent activation certificate with the same public/private key pair, whose private key, as discussed above, is encrypted with the public key of the secure repository resident on the new reading device/installation).

Yet another alternative for obtaining symmetric key 14A exists from an OpenCard. OpenCards each contain a key or key pair to which titles are sealed. When the user wishes to read the same titles on a different reader 92, the reader 92 must be installed on a device having an OpenCard slot. Accordingly, when the user inserts the OpenCard in the device, the titles are automatically available for reading. Thus, no special steps are required when users want to read OpenCard-based titles on multiple readers 92, since, in effect, the title is bound to the card rather than to a particular activation certificate and/or persona.

Upgrading or Replacing the Reader

If a user loses, replaces or upgrades his/her reader, it is important that the user be able to read previously-purchased titles (e.g., level 5 titles) on the new Reader. According to an aspect of the invention, enabling users to read previously purchased content on new readers 92 is performed using the same mechanisms that allow them to read on multiple readers 92: the new reader 92 acquires the required activation certificate (i.e., an activation certificate with the key pair contained in previous activation certificates issued to the user's persona).

Enforcing a limit on the number of activations of readers 92 in the manner described above simplifies the upgrade/replacement process. As long as the user has not exceeded the applicable limit on activations, he can activate a new/upgraded/replacement reader 92 just as if he were activating another one of several readers owned by that user. A user may "cancel" an activation of an old reader by deleting the activation certificate, but doing so does not necessarily increase the number of available activations for a particular persona, since the activation authority (e.g., the activation servers that users contact to obtain activation certificates and secure repositories 82), does not necessarily have any way to verify that the activation certificate has been deleted, or has not been backed up in a recoverable manner. Therefore, in one embodiment of the invention, deleting the activation certificate does not "reset" the ambient limitation on new activations for a particular persona.

Recovering a Lost or Damaged Title

A user may backup titles, for example, by copying eBook file 10 to removable magnetic disk 29, optical disk 31, or a removable, non-volatile memory card. If the titles ever become lost or damaged on the primary storage of a particular reading device, the titles can be restored from backup storage. However, in the case where titles are, for some reason, not backed up, it may be possible to recover any titles lost or damaged from the retailer. For example, the user may keep the receipt page from a title purchase (i.e., the page that contains the download links), and simply "re-visit" the link to connect to a download server to obtain a new copy of the eBook ("LIT") file 10 that embodies the title. Users can keep their receipts locally or alternatively, the retail store may chose to offer customers the service of storing their receipts on retailer's server.

In a preferred embodiment of the invention, however, receipts have an expiration time/date (e.g., the encrypted blob associated with the link that is clicked to contact the download server may have an expiration time/date incorporated within it), such that clicking a download link more that a predetermined amount of time after it was issued (e.g., one hour) will cause the download server to refuse to download the title. In this case, the retailer may have a record of the purchase and may provide a new copy of the receipt/download link. In order to recover a lost or damaged eBook title, the user will have to connect to the merchant from which the eBook title was purchased. After the user is identified, the merchant site will present the user with a list of receipts from which the user will choose the appropriate one. The user may then locate the title they wish to recover, and click on the link provided for download. Barring any restrictive policies from the merchant site, the user should be able to re-download the eBook title they lost. It is generally not necessary for the merchant to restrict re-downloading of titles, since the user was always free to copy the title from machine to machine (subject, of course, to the condition that level 5 titles do not work on readers activated for a persona other than the persona that purchased the title), and thus restricting the re-downloading of titles provides no additional copy protection. It should be observed, however, that the decision to provide free "re-downloading" privileges is within the discretion of the merchant, since the merchant may view the re-downloading as a service for which the merchant desires to collect a fee.

Supporting Multiple Activated Readers on the Same PC

It is preferable that the reader for laptop and desktop PCs be designed to support multiple users sharing the same computer. So long as the users have different local accounts on the PC they share, the reader may store all user-specific data on the appropriate user data-space, keyed off of their respective profiles and "current user" registry values. For example, eBook files 10 may be stored, for each user, in a directory logically contained within the top-level directory for that user's profile. In the case of the activation process, the process may ensure that the reader 92 being activated and the components being downloaded (e.g., secure repository 82 and the activation certificate) are tied to the current user (e.g., the currently logged-in user on a workstation running the MICROSOFT WINDOWS NT operating system).

Additionally, once the reader is activated, it may display the PASSPORT™ name for the user for whom it was activated, for example on a splash screen and a quick settings page. On the quick settings page, the PASSPORT™ name for the user that last activated the reader will be shown immediately above the activation link. This allows for proper handling by the client-side web commerce object 86 of the activation certificate and encrypted PASSPORT™ ID upload, during the shopping process for fully individualized titles (level 5 protected).

The process by which multiple users can activate the same reader 92 on an exemplary shared system is as follows. The Reader will check whether it has been Activated during startup. This check is performed by checking for an ActivationComplete RegKey, under HKEY_CURRENT_USER\Software\Microsoft\eBook\. Because this RegKey is written to the HKCU branch, it ensures that it will be user-specific and tied to the currently logged on username on the computer. If this RegKey is not found or is not set to 1 (i.e., a successful activation has taken place) the user follows the steps to activate the reader, as discussed above. After the download is complete, the activation ACTIVEX control 84 queries the operating system for the username for the currently logged on user on the PC. If no username is returned, it will assume "DefaultUser" as the username.

The ACTIVEX control 84 then queries the registry to find out where the reader was installed. It then creates a directory under the MS Reader installation directory that will be named: .\<username>\SecureRepository (<username> as determined by the operating system query). Once the directory is created, the ACTIVEX control 84 populates the HKCU\..\eBook\SecureRepository key, with the full path to that directory. In that directory, the ACTIVEX control 84 installs secure repository 82 and the activation certificate. It then executes secure repository 82 with the "-install" parameter for self-registration of secure repository 82. Assuming all of the above steps succeeded, the ACTIVEX control 84 stamps the ActivationComplete RegKey.

License Format

Below is an exemplary license, which is used for every download of fully individualized titles. The license is a construct that defines the rights that the user can exercise upon purchase of the title, in addition to defining the requirements for unsealing the symmetric key to exercise those rights. Examples of "rights" that could be represented in the license are rendering the content (e.g., in the example of text content, reading it on the monitor of a PC), printing the content, or copying-and-pasting portions of the content. It is noted that the exemplary license format is not intended to limit the scope of the present invention as other license formats having greater or lesser information are possible.

It is preferable that language chosen to represent a license is XML, and the format of the license is based on the Extended Rights Markup Language (XrML) Specification. This is a well-suited markup language to describe usage rights in a flexible manner. XrML also provides for great interoperability and will allow for any technology investments made on components that generate and manage these licenses to be leveraged long-term. In a preferred embodiment, only those expressed in the license are granted to the license—i.e., if a right is not expressly granted, it is denied. However, it will be appreciated by those skilled in the art that other arrangements are possible, such as where a default set of rights is presumed unless expressly denied or modified by the license.

The top-level tags in a collapsed format are as follows:

```
<?xml version="1.0" ?>
  <!DOCTYPE XrML SYSTEM "xrml.dtd">
  ⊡ <XrML>
    ⊡ <BODY type="LICENSE" version="2.0">
       <ISSUED>2000-01-27T15:30</ISSUED>
```

-continued

```
± <DESCRIPTOR>
- <!-- ========================================= -->
- <!-- Licensed Book                              -
  -->
- <!-- ========================================= -->
± <WORK>
     ==
     =================================================
        Components of the book
        One chapter, and one image with digest value
     =================================================
     ==
     =================================================
     ==
          Usage rights of the book
     =================================================
     ==
- <!-- ========================================= -->
- <!-- Licensor of the book
  -->
- <!-- ========================================= -->
± <LICENSOR>
- <!-- ========================================= -->
- <!-- Licensees of the book                      -
  -->
- !-- ========================================= -->
± <LICENSEDPRINCIPALS>
</BODY>
- <!-- ========================================= -->
- <!-- Signature of the License Body         -->
- <!-- ========================================= -->
± <SIGNATURE>
</XrML>
```

The first line of the XrML structure above defines the version of the XML language used to create the XrML license. The second line specifies the name of the DTD file used to parse the XML file. The BODY tag provides the type of license, the version of the XrML specification used when the license was generated, and the date when it was issued. It is also the meta-tag for the whole license, which has the following sub-sections: WORK, LICENSOR, LICENSED-PRINCIPALS, and SIGNTURE. WORK contains all the semantic information about the license, including the usage RIGHTS. The contents of this field (including the tags) constitute the data that is hashed and signed. LICENSOR contains information pertaining the entity that issued the license, usually a Retailer. LICENSEDPRINCIPALS contains a series of principals that must be authenticated when exercising the usage rights specified in a license. SIGNATURE contains the hash/digest of the LICENSEBODY as well as information about how the hash was created, including the algorithm used. It also includes the DIGEST encoded in accordance with the algorithm named by the licensor when issuing the license. The DIGEST and SIGNATURE tags provide the authentication information used to validate the entire license in a way that cannot be tampered with.

Structure of the BODY Tag

The main tag of an XrML license construct is the BODY tag, which contains the following tags:

```
- <BODY type="LICENSE" version="2.0">
         <ISSUED>2000-01-27T15:30</ISSUED>
  - <DESCRIPTOR>
       - <OBJECT type="self-proving-EUL">
                   <ID type="MS-GUID">7BD394E- C841-434d-A33F-
                           5456D5E2AAAE</ID>
             </OBJECT>
        </DESCRIPTOR>
- <!-- ================================================ -->
- <!-- Licensed Book                                    -->
- <!-- ================================================ -->
- <WORK>
       - <OBJECT type="BOOK-LIT-FORMAT">
                   <ID type="ISBN">8374-39384-38472</ID>
                   <NAME>A book of James</NAME>
             </OBJECT>
  <CREATOR type ="author">James the first</CREATOR>
                         <CREATOR    type="author">James the
             second </CREATOR>
- <OWNER>
       - <OBJECT type="Person">
                   <ID type="US-SSN">103-74-8843</ID>
                   <NAME>Mike the man</NAME>
                   <ADDRESS
                           type="email">mike@man.com</ADDRESS>
             </OBJECT>
  - <PUBLICKEY>
             <ALGORITHM>RS- 512</ALGORITHM>
        - <PARAMETER name="public exponent">
                                                       <VALUE
                     encoding="integer32">65537</VALUE>
             </PARAMETER>
        - <PARAMETER name="modulus">
                              <VALUE    encoding="base64"
                    size="512">u+aEb/WqgyO+aDjgYLxwrk
                    tqFDR4HZeIeR1g+G5vmKNZRt9FH4oueP
                    Wz/AJYnn2NdxoJ6mcIIAQVe6Droj2fxA=
                    =</VALUE>
             </PARAMETER>
```

-continued

```xml
            </PUBLICKEY>
        </OWNER>
<!-- ======================================================= -->
<!-- Components of the book                                  -->
<!-- One chapter, and one image with digest value            -->
<!-- ======================================================= -->
<PARTS>
    <WORK>
        <OBJECT type="Chapter">
            <ID type="relative">0</ID>
            <NAME>Chapter 1</NAME>
        </OBJECT>
    </WORK>
    <WORK>
        <OBJECT type="Image">
            <ID type="relative">1</ID>
            <NAME>Image 1: Photon Celebshots
                Dogs</NAME>
        </OBJECT>
        <DIGEST sourcedata="LicensorMeta">
            <ALGORITHM>SHA1</ALGORITHM>
            <PARAMETER name="codingtype">
                <VALUE encoding="string">surface-
                    coding</VALUE>
            </PARAMETER>
                        <VALUE     encoding="base64"
                size="160">OtSrhD5GrzxMeFEm8q4pQI
                CKWHI=</VALUE>
        </DIGEST>
    </WORK>
</PARTS>
<!-- ======================================================= -->
<!-- Usage rights of the book                                -->
<!-- ======================================================= -->
<RIGHTSGROUP name="Main Rights">
    <DESCRIPTION>Some desc</DESCRIPTION>
    <BUNDLE>
        <TIME>
            <FROM time="2000-01-27T15:30"/>
            <UNTIL time="2000-01-27T15:30"/>
        </TIME>
        <ACCESS>
            <PRINCIPAL sequence="2">
                <ENABLINGBITS type="sealed-des-
                    key">
                    <VALUE encoding="base64"
                        size="512">InHtn/t2dp3u+ZqL
                        kbd7MK0K4xR4YdSXaEvuk2Loh
                        9ZRJEcPzCw+xM7zbPrJb6ESj70
                        +B2fWTcxxDD+6WUB/Lw==</
                        VALUE>
                </ENABLINGBITS>
            </PRINCIPAL>
        </ACCESS>
    </BUNDLE>
    <RIGHTSLIST>
        <VIEW>
            <ACCESS>
                <PRINCIPAL sequence="2">
                    <ENABLINGBITS type="sealed-
                        des-key">
                        <VALUE encoding="base64"
                            size="512">InHtn/t2dp3u
                            +ZqLkbd7MK0K4xR4YdSX
                            aEvuk2Loh9ZRJEcPzCw+x
                            M7zbPrJb6ESj70+B2fWTcx
                            xDD+6WUB/Lw==</VALU
                            E>
                    </ENABLINGBITS>
                </PRINCIPAL>
                <PRINCIPAL sequence="3"/>
            </ACCESS>
            <ACCESS>
                <PRINCIPAL type="licensor">
                    <ENABLINGBITS type="sealed-
                        des-key">
                        <VALUE encoding="base64"
                            size="512">InHtn/t2dp3u
                            +ZqLkbd7MK0K4xR4YdSX
```

```xml
                                                aEvuk2Loh9ZRJEcPzCw+x
                                                M7zbPrJb6ESj70+B2fWTcx
                                                xDD+6WUB/Lw==</VALU
                                                E>
                                        </ENABLING BITS>
                                </PRINCIPAL>
                        </ACCESS>
                </VIEW>
                <PRINT maxcount="5">
                    <FEE>
                        <MONETARY>
                            <PERUSE value="5.00">
                                <CURRENCY iso-code="USD"
                                    />
                            </PERUSE>
                            <ACCOUNT>
                                <ACCOUNTFROM id="B-
                                    0234-0928392"/>
                                <HOUSE id="XYZ"
                                    url="http://somehouse.co
                                    m/payme.asp"/>
                            </ACCOUNT>
                        </MONETARY>
                    </FEE>
                    <TRACK>
                        <PROVIDERNAME>e-
                            tracker</PROVIDERNAME>
                        <PROVIDERID id="US1023"
                            type="Tracker ID"/>
                        <PARAMETER name="tracking
                            address">
                            <VALUE
                                encoding="url">"http://sometr
                                ackingservice/trackme.asp"></
                                VALUE>
                        </PARAMETER>
                        <PARAMETER name="tracking support
                            address">
                            <VALUE
                                encoding="url">"http://sometr
                                ackingservice/supportme.asp">
                            </VALUE>
                        </PARAMETER>
                    </TRACK>
                    <TERRITORY>
                        <LOCATION country="us" state="CA"
                            city="El Segundo"
                            postalcode="90245"/>
                        <LOCATION country="jp"/>
                    </TERRITORY>
                </PRINT>
            </RIGHTSLIST>
        </RIGHTSGROUP>
    </WORK>
<!-- ======================================================== -->
<!-- Licensor of the book                                     -->
<!-- ======================================================== -->
<LICENSOR>
    <OBJECT type="Principal-Certificate">
        <ID type="MS-GUID">7BD394E-C841-434d-A33F-
            5456D5E2AAAE</ID>
        <NAME>Barnes and Noble</NAME>
    </OBJECT>
    <PUBLICKEY>
        <ALGORITHM>RS-512</ALGORITHM>
        <PARAMETER name="public exponent">
            <VALUE
                encoding ="integer32">65537</VALUE>
        </PARAMETER>
        <PARAMETER name="modulus">
            <VALUE encoding="base64"
                size="512">u+aEb/WqgyO+aDjgYLxwrktqFD
                R4HZeIeR1g+G5vmKNZRt9FH4ouePWz/AJYn
                n2NdxoJ6mcIIAQVe6Droj2fxA==</VALUE>
        </PARAMETER>
    </PUBLICKEY>
</LICENSOR>
<!-- ======================================================== -->
<!-- Licensees of the book                                    -->
```

-continued

```xml
<!-- ============================================================ -->
<LICENSEDPRINCIPALS>
    <PRINCIPAL>
        <OBJECT type="program">
            <ID type="msprogid">XrML.interpreter</ID>
            <NAME>DRPL INTERPRETER</NAME>
        </OBJECT>
        <AUTHENTICATOR type="drm-module-verifier">
            <ID type="microsoft-
                progid">ms.drm.authenticode</ID>
            <NAME>DRMAuthenticode</NAME>
            <AUTHENTICATIONCLASS>
                <VERSIONSPAN min="2.0" max="3.4"/>
                <VERSION>5.0</VERSION>
                <SECURITYLEVEL>5</SECURITYLEVEL>
            </AUTHENTICATIONCLASS>
            <VERIFICATIONDATA type="signature-key">
                <PUBLICKEY>
                    <ALGORITHM>RS-
                        512</ALGORITHM>
                    <PARAMETER name="public
                        exponent">
                        <VALUE
                            encoding="integer32">65537<
                            /VALUE>
                    </PARAMETER>
                    <PARAMETER name="modulus">
                        <VALUE encoding="base64"
                            size="512">u+aEb/WqgyO+aD
                            jgYLxwrktqFDR4HZeIeR1g+G5
                            vmKNZRt9FH4ouePWz/AJYnn2
                            NdxoJ6mcIIAQVe6Droj2fxA==
                            </VALUE>
                    </PARAMETER>
                </PUBLICKEY>
            </VERIFICATIONDATA>
        </AUTHENTICATOR>
    </PRINCIPAL>
    <PRINCIPAL>
        <OBJECT type="MS Ebook Device">
            <ID type="INTEL SN">Intel PII 92840-AA9-
                39849-00</ID>
            <NAME>Johns Computer</NAME>
        </OBJECT>
        <AUTHENTICATOR type="drminternal-certverify-
            program">
            <ID type="microsoft-progid">2323-2324-abcd-
                93a1</ID>
            <AUTHENTICATIONCLASS>
                <VERSION>1.x-2.5</VERSION>
            </AUTHENTICATIONCLASS>
            <VERIFICATIONDATA type="authenticode-
                named-root">
                <PUBLICKEY>
                    <ALGORITHM>RS-
                        512</ALGORITHM>
                    <PARAMETER name="public
                        exponent">
                        <VALUE
                            encoding="integer32">65537<
                            /VALUE>
                    </PARAMETER>
                    <PARAMETER name="modulus">
                        <VALUE encoding="base64"
                            size="512">u+aEb/WqgyO+aD
                            jgYLxwrktqFDR4HZeIeR1g+G5
                            vmKNZRt9FH4ouePWz/AJYnn2
                            NdxoJ6mcIIAQVe6Droj2fxA==
                            </VALUE>
                    </PARAMETER>
                </PUBLICKEY>
            </VERIFICATIONDATA>
            <VERIFICATIONDATA>
                <PARAMETER name="bbid">
                    <VALUE
                        encoding="string">xxzzy</VALUE>
                </PARAMETER>
                <PUBLICKEY>
                    <ALGORITHM>RS-
```

```
                    512</ALGORITHM>
                <PARAMETER name="public
                    exponent">
                    <VALUE
                        encoding="integer32">3</VAL
                        UE>
                </PARAMETER>
                <PARAMETER name="modulus">
                    <VALUE encoding="base64"
                        size="90">33845URT203987=
                        =</VALUE>
                </PARAMETER>
              </PUBLICKEY>
            </VERIFICATIONDATA>
          </AUTHENTICATOR>
        </PRINCIPAL>
    <PRINCIPAL>
        <OBJECT type="application">
            <ID type="MS PROG-
                ID">43984938476jshd</ID>
            <NAME>MS Book Reader 2.0</NAME>
        </OBJECT>
        <AUTHENTICATOR type="drminternal-digest-
                program">
            <ID type="microsoft-progid">2323-2324-abcd-
                93a1</ID>
            <AUTHENTICATIONCLASS>
                <VERSION>1.x-2.5</VERSION>
            </AUTHENTICATIONCLASS>
            <VERIFICATIONDATA type="authenticode-
                    named-root">
                <DIGEST>
                    <ALGORITHM>MD5</ALGORITHM>
                    <VALUE encoding="base64"
                        size="90">bXlwYXNzd29yZA==</V
                        ALUE>
                </DIGEST>
            </VERIFICATIONDATA>
        </AUTHENTICATOR>
      </PRINCIPAL>
    </LICENSEDPRINCIPALS>
</BODY>
```

License Authenticity

Secure repository 82 authenticates a license via the SIGNATURE and DIGEST tags. This is such that the client software can validate that the content being rendered came from a trusted source. A more detailed example of these tags is provided below:

```
<!--  =======================================
        Signature of the License Body
      =======================================
  -->
<SIGNATURE>
    <DIGEST>
        <ALGORITHM>SHA1</ALGORITHM>
        <PARAMETER name="codingtype">
            <VALUE    encoding="string">surface-
                coding</VALUE>
        </PARAMETER>
        <VALUE encoding="base64"
            size="160">OtSrhD5GrzxMeFEm8q4pQICKWHI=<
            /VALUE>
    </DIGEST>
    <VALUE encoding="base64"
        size="512">A7qsNTFT2roeL6eP+IDQFwjIz5XSFBV+NB
        FOeNa7de+1D6n+MPJa3J7ki8Dmwmuu/pBciQnJ4xGaq
        RZ5AYoWRQ==</VALUE>
</SIGNATURE>
```

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A computing device adapted to communicate via a network infrastructure, comprising:

a long-term storage device;

a user interface adapted to interact with the computing device and for launching a rendering application; and a management module, separate from said rendering application and interfaceable to any of a plurality of rendering applications that include said rendering application, that receives a communication from the rendering application to access first information stored on the long-term storage device, wherein the first information is stored in an encrypted format and wherein the management module returns first data which enables the use of said first information by said rendering application, wherein said first data includes said first information in an unencrypted format.

2. A computing device adapted to communicate via a network infrastructure, comprising:
- a long-term storage device;
- a user interface adapted to interact with the computing device and for launching a rendering application; and
- a management module, separate from said rendering application and interfaceable to any of a plurality of rendering applications that include said rendering application, that receives a communication from the rendering application to access first information stored on the long-term storage device, wherein the first information is stored in an encrypted format and wherein the management module returns first data which enables the use of said first information by said rendering application, wherein second information pertaining a user or a transaction is returned by the management module to the rendering application for usage on the computing device, and wherein said second information is selected from the group consisting of: a name, a credit card number, and a receipt number.

3. A computing device adapted to communicate via a network infrastructure, comprising:
- a long-term storage device;
- a user interface adapted to interact with the computing device and for launching a rendering application; and
- a management module, separate from said rendering application and interfaceable to any of a plurality of rendering applications that include said rendering application, that receives a communication from the rendering application to access first information stored on the long-term storage device, wherein the first information is stored in an encrypted format and wherein the management module returns first data which enables the use of said first information by said rendering application, and wherein said management module is interfaceable with a secure repository receivable via said network infrastructure, wherein said secure repository applies a key to second data.

4. The computing device of claim 3, wherein said second data comprises a key which decrypts said first information.

\* \* \* \* \*